(12) United States Patent
Boettcher et al.

(10) Patent No.: US 9,149,889 B2
(45) Date of Patent: Oct. 6, 2015

(54) ORIENTATING A LASER CUTTING BEAM

(75) Inventors: Christian Boettcher, Stuttgart (DE);
Werner Dilger, Leonberg (DE); Peter Demel, Stuttgart (DE); Juergen-Michael Weick, Asperg (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 349 days.

(21) Appl. No.: 12/977,308

(22) Filed: Dec. 23, 2010

(65) Prior Publication Data
US 2011/0108533 A1 May 12, 2011

Related U.S. Application Data

(63) Continuation of application No. PCT/DE2009/000891, filed on Jun. 26, 2009.

(30) Foreign Application Priority Data

Jun. 28, 2008 (DE) .......................... 10 2008 030 783

(51) Int. Cl.
*B23K 26/00* (2014.01)
*B23K 26/38* (2014.01)
(Continued)

(52) U.S. Cl.
CPC .............. *B23K 26/38* (2013.01); *B23K 26/041* (2013.01); *B23K 26/043* (2013.01); *B23K 26/048* (2013.01); *B23K 26/1441* (2013.01); *B23K 26/1476* (2013.01)

(58) Field of Classification Search
USPC .............................. 219/121.6, 121.72, 121.67
See application file for complete search history.

(56) References Cited

U.S. PATENT DOCUMENTS

| | | | |
|---|---|---|---|
| 4,205,828 A | 6/1980 | Hooper et al. | |
| 4,219,370 A | 8/1980 | Hoaglin et al. | |
| 4,675,501 A | 6/1987 | Klingel | |

(Continued)

FOREIGN PATENT DOCUMENTS

| | | |
|---|---|---|
| CN | 1541801 A | 11/2004 |
| CN | 2677079 Y | 2/2005 |

(Continued)

OTHER PUBLICATIONS

International Preliminary Report on Patentability from corresponding PCT Application No. PCT/DE2009/000891, issued Feb. 8, 2011, 7 pages.

(Continued)

*Primary Examiner* — Dana Ross
*Assistant Examiner* — Ayub Maye
(74) *Attorney, Agent, or Firm* — Fish & Richardson P.C.

(57) ABSTRACT

A method for orientating a focused laser cutting beam eccentrically relative to the nozzle axis of a cutting gas nozzle and a laser processing machine for performing the same, the method including: arranging a redirecting mirror in a beam path of the laser cutting beam upstream of the cutting gas nozzle, the mirror being rotated about a direction which is coaxial with the nozzle axis and/or about a direction which is perpendicular relative to the nozzle axis and which corresponds to the beam incidence direction of the laser beam on the redirecting mirror. The cutting gas nozzle and the redirecting mirror are arranged in a second structural unit of a laser processing head, for rotation about the direction corresponding to the beam incidence direction relative to a first structural unit.

13 Claims, 4 Drawing Sheets

(51) Int. Cl.
 *B23K 26/04* (2014.01)
 *B23K 26/14* (2014.01)

(56) References Cited

U.S. PATENT DOCUMENTS

| | | | |
|---|---|---|---|
| 4,825,036 | A | 4/1989 | Bickel et al. |
| 4,972,062 | A | 11/1990 | Aharon |
| 5,059,759 | A | 10/1991 | Kudo et al. |
| 5,265,849 | A | 11/1993 | Yamashita |
| 5,286,006 | A | 2/1994 | Ogura |
| 5,463,202 | A | 10/1995 | Kurosawa et al. |
| 5,500,506 | A | 3/1996 | Lawson |
| 5,582,749 | A | 12/1996 | Mori et al. |
| 5,793,015 | A | 8/1998 | Walczyk |
| 5,847,358 | A * | 12/1998 | Franke et al. ............ 219/121.67 |
| 5,850,068 | A * | 12/1998 | Peters et al. ............. 219/121.83 |
| 6,133,541 | A | 10/2000 | Neubauer et al. |
| 6,201,207 | B1 | 3/2001 | Maruyama et al. |
| 6,326,588 | B1 | 12/2001 | Neubauer et al. |
| 6,423,928 | B1 * | 7/2002 | Piwczyk ................... 219/121.67 |
| 6,922,605 | B1 | 7/2005 | Olsen |
| 8,410,395 | B2 * | 4/2013 | Mienhardt ............... 219/121.69 |
| 2003/0102294 | A1 * | 6/2003 | Kinbara et al. ........... 219/121.83 |
| 2004/0185758 | A1 | 9/2004 | Olsen |
| 2007/0023405 | A1 * | 2/2007 | Diem ....................... 219/121.84 |
| 2007/0075055 | A1 * | 4/2007 | Komatsu .................. 219/121.63 |
| 2007/0228025 | A1 | 10/2007 | Horn et al. |

FOREIGN PATENT DOCUMENTS

| | | | | |
|---|---|---|---|---|
| DE | 19860585 | A1 | | 7/2000 |
| DE | 102005027836 | A1 | | 12/2006 |
| EP | 0873813 | A1 | | 10/1998 |
| EP | 1149653 | A2 | | 10/2001 |
| EP | 1475182 | A1 | | 11/2004 |
| EP | 1684046 | A1 | | 7/2006 |
| FR | 2869559 | A1 | | 11/2005 |
| JP | 57100889 | A | | 6/1982 |
| JP | 2092485 | A | | 4/1990 |
| JP | 02092485 | A * | 4/1990 | ............ B23K 26/06 |
| JP | 0557470 | A | | 3/1993 |
| JP | 05057470 | A * | 3/1993 | ............ B23K 26/04 |
| JP | 0639571 | A | | 2/1994 |
| JP | H08500060 | A | | 1/1996 |
| JP | 09150284 | A | | 6/1997 |
| JP | H09507657 | A | | 8/1997 |
| JP | 3083320 | B2 | | 9/2000 |
| JP | 200521932 | A | | 1/2005 |

OTHER PUBLICATIONS

Office Action from German Patent Office for corresponding German Application No. 10 2008 030 783, dated Dec. 2, 2010, with English translation, 4 pages.

Wiilach et al., "Melt expulsion by a coaxial gas jet in trepanning of CMSX-4 with microsecond Nd:YAG laser radiation", Proceeedings of the SPIE, vol. 5063, pp. 435-440, Nov. 18, 2003.

* cited by examiner

ORIENTATING A LASER CUTTING BEAM

CROSS-REFERENCE TO RELATED APPLICATIONS

This application is a continuation of, and claims priority under 35 U.S.C. §120 from, PCT/DE2009/000891, filed on Jun. 26, 2009, and designating the U.S., which claims priority under 35 U.S.C. §119 to German Patent Application No. 10 2008 030 783.1, filed on Jun. 28, 2008. The contents of the prior applications are hereby incorporated by reference in their entirety.

TECHNICAL FIELD

The present disclosure relates to orienting a laser cutting beam and a laser processing machine for performing the same.

BACKGROUND

In order to connect two workpieces, e.g., tubular workpieces, to each other to form an angle of, for example, 90°, each workpiece can first be cut obliquely at an angle of 45° and subsequently welded together at the cut edges. For the welding operation, the cut edges should abut each other in as planar a manner as possible which is difficult, however, when the laser cutting beam is oriented perpendicularly relative to the surface of the workpiece surface during the cutting operation because warped cut faces can be produced during separation. In order to prevent this, during oblique laser beam cutting, the laser cutting beam and the supersonic cutting gas flow which supports the laser cutting is inclined at an angle relative to the surface of the workpiece, the so-called oblique cutting angle. If the oblique cutting angle varies during the cutting operation, a planar cut face can also be produced with an oblique cutting action on a tube so that, for example, welding the cut edges is substantially easier. The oblique cutting operation can be carried out not only on tubular workpieces but also on thick and plate-like workpieces in order to be able to more readily weld them together at the oblique cut edges, for example, which are formed during the oblique cutting operation.

However, the above-described oblique laser beam cutting operation has not yet been completely mastered, i.e., there are substantial advance rate reductions (at an oblique cutting angle of 45° of up to 70%) and substantial reductions in quality in comparison with conventional laser beam cutting with a laser cutting beam orientated perpendicularly relative to the workpiece surface. For example, the cut edges produced during the oblique laser beam cutting operation can have surface qualities which vary in accordance with the oblique cutting angle such that it is possible to observe a powerful burr formation at one cut edge and a rough surface structure at the other cut edge.

In the case of trepanning microholes in turbine blades, the article "Melt Expulsion by a Coaxial Gas Jet in Trepanning of CMSX-4 with Microsecond Nd:YAG Laser Radiation," (Proceedings of the SPIE, Vol. 5063) discloses laterally displacing the laser cutting beam, which is orientated at an oblique angle (in this case, for a drilling operation) relative to the workpiece, and the supersonic cutting gas flow or the cutting gas nozzle, which is orientated parallel with the laser cutting beam, in order to position the dynamic pressure point or the high-pressure region of the supersonic cutting gas flow directly over the hole. In that manner, it is intended to prevent the gas pressure and the thickness of the hardened melt from varying periodically along the wall of the hole, as is the case with a coaxial orientation of the gas flow and the laser beam axis when the workpiece surface is arranged obliquely relative thereto. Due to the lateral displacement, those oscillations are intended to be prevented and an increased gas flow is intended to be achieved through the hole, to allow easier discharge of the melt at the lower side of the hole. In order to increase the size of a hole, which is obtained by trepanning, another hole is placed beside it with overlapping. Overlaps between the holes in the range between 50% and 80% having been found to be advantageous.

SUMMARY

In some applications, for example, in the case of high-speed cutting, it is advantageous, in order to increase the cutting speed, if the laser cutting beam and the center of the cutting gas flow strike the workpiece surface in a manner displaced relative to each other. In order to produce such displacement, the laser cutting beam can be oriented eccentrically relative to the nozzle axis or the nozzle center.

The present disclosure provides a method for orientating a focused laser cutting beam eccentrically relative to the nozzle axis or nozzle centre of a cutting gas nozzle, a method based thereon for oblique laser beam cutting and a laser processing head and a laser processing machine for carrying out the methods which can be controlled in a particularly simple manner so that a high-quality cut is possible at high advance speeds during oblique cutting.

In general, in one aspect, a method for orientating a focused laser cutting beam eccentrically relative to the nozzle axis of a cutting gas nozzle is disclosed, in which the method includes: rotating a redirecting mirror arranged in the beam path of the laser cutting beam upstream of the cutting gas nozzle about a direction which is coaxial with the nozzle axis and/or about a direction which is perpendicular relative to the nozzle axis and which corresponds to the beam incidence direction of the laser beam on the redirecting mirror. Owing to the eccentric orientation of the laser beam in the nozzle opening, the position of the point of impact of the laser beam on a workpiece to be processed is intentionally displaced relative to the centre of the cutting gas flow which is discharged from the nozzle. That intentional displacement is taken into consideration when controlling the laser processing head, in which the cutting gas nozzle is arranged, so that the laser cutting beam strikes the workpiece at the correct position.

The eccentric orientation of the laser cutting beam owing to rotation of the redirecting mirror in the manner described above can be taken into consideration in technical control terms by the redirecting mirror being rotated at an angle of rotation from a rest position, in which the beam reflection direction of the laser cutting beam extends coaxially relative to the nozzle axis and the redirecting mirror is simultaneously rotated in a reduced or opposing manner together with the cutting gas nozzle at the same angle of rotation about the direction corresponding to the beam incidence direction. By the axis of rotation of the redirecting mirror being connected in technical control terms to an axis of rotation which is provided in any case in order to orientate the cutting gas nozzle relative to the workpiece, it is possible to carry out control of the macro-movement of the laser processing head, in which the nozzle and the redirecting mirror are arranged, in a manner as if the laser processing beam were orientated coaxially relative to the nozzle axis.

In order to focus the laser cutting beam on the workpiece, a lens element can be provided between the redirecting mirror and the cutting gas nozzle and also serves to build up the pressure of the cutting gas so that a supersonic cutting gas flow can be produced by the nozzle. Alternatively, the redirecting mirror may be in the form of a concave mirror, e.g., a parabolic mirror, in order to focus the laser cutting beam. In that case, a pressure aperture, for example in the form of a planar plate, may be provided for building up the pressure of the cutting gas, or the cutting gas nozzle may be in the form of an annular gap nozzle.

In some implementations, the cutting gas nozzle and the redirecting mirror are arranged in a second structural unit of a laser processing head, where the second structural unit is arranged for rotation about the direction corresponding to the beam incidence direction relative to a first structural unit. The axis of rotation necessary for the orientation or angular adjustment of the cutting gas nozzle relative to the workpiece can act as a compensation axis in this case.

The above-described method for eccentrically orientating the laser cutting beam can advantageously be used in various applications, for example, during high-speed cutting, in which the laser cutting beam is displaced in an advance direction relative to the centre of the supersonic cutting gas flow, or during oblique cutting in which a displacement between the laser cutting beam and the center of the cutting gas flow at right-angles relative to the direction of advance is advantageous. Such an oblique cutting method is described in greater detail below.

In another aspect, a method for obliquely cutting a workpiece with a laser beam is disclosed, in which a supersonic cutting gas flow discharged from a cutting gas nozzle is orientated at an oblique cutting angle relative to the workpiece surface. The workpiece and the laser cutting beam are moved relative to each other during the oblique laser beam cutting, and the oblique cutting angle extends along a plane that is substantially perpendicular to a direction of advance. The position of the laser cutting beam on the workpiece surface is adjusted, during the relative movement, using the above-described method for eccentrically orientating the laser cutting beam in such a manner that the laser cutting beam strikes the workpiece surface in a high-pressure region formed within the supersonic cutting gas flow.

The position of the high-pressure region within the supersonic cutting gas flow is dependent in this instance on the oblique cutting angle, which may vary during the laser cutting operation. The high-pressure region and therefore the position of the laser cutting beam on the workpiece surface are displaced for angles at which the laser cutting beam is not orientated perpendicularly relative to the workpiece surface, relative to the nozzle axis of the cutting gas nozzle which corresponds to the center of the supersonic cutting gas flow.

A displacement between the laser cutting beam and the center of the supersonic cutting gas flow is advantageous not only in producing holes (trepanning) but also in oblique cutting with a laser beam, i.e., during an advance movement between the workpiece and the laser cutting beam. In that case the cutting gas dynamics are a limiting factor: a large portion of the cutting gas flows away over the workpiece surface, which extends obliquely relative to the supersonic cutting gas flow, and is consequently no longer available for the cutting operation. A static pressure level that is produced with a central nozzle is reduced in the cutting gap and pressure pulses are produced at the wall of the cutting gap and lead to poor cutting results.

It is possible to obtain a displacement of the cutting gap into a region which is more favorable in technical flow terms by producing a desired displacement (eccentricity) between the laser cutting gas flow and the center of the supersonic cutting gas flow. The displacement of the laser cutting beam or the cutting gap takes place perpendicularly to the direction of advance and by a defined value that is dependent on the oblique cutting angle (which is generally variable). The coupling of the supersonic cutting gas flow with the cutting gap that is improved in this manner results in an increase in the static pressure level in the cutting gap by several orders of magnitude. Exemplary numerical flow calculations produced an increase by approximately 350% compared with previous methods. An increase in the static pressure level in the cutting gap demonstrably results in improved melt discharge, which, in turn, prevents overheating of the cutting gap owing to accumulation of metal melt. The discharge capacity of the melt optimized in this manner can therefore be converted directly into an increase in advance rate. In this instance, the maximum advance rates achieved barely differ from the advance rates, which are dependent on the metal sheet thickness and which can be achieved with conventional laser beam cutting. It is also possible to produce edge and surface qualities that bear comparison with those in perpendicular laser beam cutting at the cut edges at both sides.

The oblique cutting angle should be varied perpendicularly relative to the direction of advance, for example between −45° and 45°, in order to produce a planar cut face in a 45° portion in a tube. When the workpiece (oblique cutting angle 0°) is orientated perpendicularly, the high-pressure region on the workpiece is at the center of the supersonic cutting gas flow in this instance and, in the case of non-perpendicular orientation, the position of the high-pressure region deviates from the center and varies with the oblique cutting angle so that the position of the laser beam on the workpiece has to be tracked in order to ensure that the laser beam remains in the high-pressure region during the oblique cutting operation.

In some implementations, the spacing between the cutting gas nozzle and the workpiece is determined in order to adjust the position of the laser cutting beam during the laser beam cutting. The spacing between the cutting gas nozzle and the workpiece generally changes during the oblique cutting operation as the oblique cutting angle changes. Since the position of the high-pressure region on the workpiece also depends on the spacing between the cutting gas nozzle and the workpiece, it can be advantageous to detect the spacing as continuously as possible during the oblique cutting operation and to use the detected spacing to adjust or adapt the position of the laser cutting beam.

In a development, the capacitance between the cutting gas nozzle and the workpiece is measured to determine the spacing, the influence of the oblique cutting angle on the capacitance being taken into consideration when the spacing is determined. A capacitive measurement of the spacing between the workpiece and the cutting gas nozzle is disclosed in EP0873813 B1 and EP1684046A1, each of which is incorporated herein by reference in its entirety. When the oblique cutting angle is changed, the orientation of the cutting gas nozzle changes relative to the workpiece, resulting in a change in the electrical field lines between the cutting gas nozzle and the workpiece and accordingly a change in the capacitance even with the same spacing. Therefore, the change in the capacitance with the oblique cutting angle can be taken into consideration for the spacing measurement in order to obtain a correct spacing value for an oblique cutting angle, respectively.

In some implementations, the position of the laser cutting beam is determined in dependence of the spacing a between the cutting gas nozzle and the workpiece surface and the diameter d of the nozzle opening. The spacing e between the center of the supersonic cutting gas flow and a laser cutting beam, which is orientated parallel with the supersonic cutting gas flow and which is arranged in its ideal cutting gap position at the centre of the high-pressure region, can be determined in accordance with the three parameters α, a and d as follows:

$$e = \sin(\alpha)(a + (d/2)\sin(\alpha)),$$

as set out in detail below. Since the current oblique cutting angle α, the nozzle diameter d and the spacing a (optionally owing to a spacing measurement) are known to the machine control, the eccentricity e can be determined in the control of the laser processing machine with which the method is carried out and be adapted in a suitable manner during the oblique cutting with a laser beam. In this instance, in particular all the necessary variables can already be predetermined in the machine code of the numerical control. The term "nozzle diameter" is not necessarily intended to be understood to be the diameter of a circular nozzle opening but instead it may optionally be possible also to use cutting gas nozzles having other geometric shapes, for example, with an elliptical shape of the nozzle opening. In that instance, the diameter of the nozzle opening relates to the maximum extent of the opening perpendicular relative to the direction of advance.

In some implementations, the laser cutting beam is focused below the workpiece upper side with a spacing of more than 50%, preferably more than 70%, of the thickness of the workpiece. Unlike conventional laser cutting operations in which the focus is focused on the workpiece surface or in the upper third or the upper half of the workpiece in order to obtain a funnel-like cutting gap, in the present use focusing in the lower half of the workpiece or optionally even below the workpiece lower side is advantageous in order to ensure high quality of the laser cutting operation.

An inert gas, e.g. nitrogen, may be selected as the cutting gas. The supersonic cutting gas flow is generally carried out with inert gases, i.e., an additional contribution of energy using reactive gases such as, for example, oxygen, does not take place. In this instance, the cutting gas is under high pressure of more than 10 bar, typically approximately 15 bar and optionally also 20 bar or more.

In another aspect, a laser processing head for obliquely cutting a workpiece using a laser cutting beam is disclosed, in which the laser processing head includes: a first structural unit for redirecting the laser cutting beam from a first direction into a second direction, which is preferably perpendicular to the first, and a second structural unit that is secured to the first structural unit, arranged for rotation about the second direction and has a cutting gas nozzle for producing a supersonic cutting gas flow. There is provided in the second structural unit a redirecting mirror for redirecting the laser beam to the cutting gas nozzle. The redirecting mirror in the second structural unit is arranged for rotation about the second direction and/or about the axial direction of the nozzle axis in order to orientate the laser cutting beam in the nozzle opening of the cutting gas nozzle eccentrically relative to the nozzle axis. The axis, about which the second structural unit is rotated, is intended to be used in this instance to compensate for the rotation of the redirecting mirror, as set out in greater detail above. A correction of the angular deviation of the cut edge can thereby also carried out.

The laser processing head may have a focusing lens, which is arranged between the redirecting mirror and the cutting gas nozzle and which also serves to build up the pressure in order to focus the laser cutting gas beam. Alternatively or additionally, the redirecting mirror may be in the form of a concave mirror, which also allows focusing. In the latter case, the pressure build-up of the cutting gas may be produced in that a pressure aperture is provided in the second structural unit. Alternatively, the pressure build-up may also be brought about in other manners, for example by the cutting gas nozzle being in the form of an annular gap nozzle.

In another aspect a laser processing machine for obliquely cutting a workpiece is disclosed, in which the laser processing machine includes: a laser processing head as described above and a control device for orientating the laser cutting beam in the nozzle opening of the cutting gas nozzle eccentrically relative to the nozzle axis by rotation of the redirecting mirror about the second direction and/or about the axial direction of the nozzle axis. The laser processing machine may be configured to carry out macro-movements about a multiple axes, for example, linear movements along the X, Y or Z axis, or rotational movements about a B axis and optionally also about a C axis.

In a development, the control device is configured for the eccentric orientation to rotate the redirecting mirror at an angle of rotation out of a rest position, in which the beam reflection direction of the laser cutting beam extends coaxially relative to the nozzle axis. The control device is further configured in this instance to rotate the second structural unit at the same angle of rotation to a lesser degree about the second direction. Owing to such a connection in technical control terms, it is possible to cause the control of the axes for the macro-movement of the laser processing head to be able to be carried out in precisely the same manner as if the laser processing beam were orientated coaxially relative to the nozzle axis.

The laser processing machine comprises in particular a movement device for moving a workpiece and the laser cutting beam relative to each other at an oblique cutting angle which extends along a plane that is at a right-angle relative to a direction of advance and at which the nozzle axis of the cutting gas nozzle is orientated relative to the surface of the workpiece. The laser processing machine can be configured in particular to cut tubular workpieces with a laser beam. However, it may also be intended to carry out oblique cutting on other workpieces, e.g., plate-like workpieces, in which the oblique cutting angle may remain constant during the oblique cutting with a laser beam.

In some implementations, the control device is configured to adjust the position of the laser cutting beam on the workpiece surface in such a manner that the laser cutting beam remains in a high-pressure region during the relative movement, where the high pressure region is formed within the supersonic cutting gas flow. This may occur in the manner set out above in connection with the oblique cutting method.

In some implementations, the laser processing machine has a spacing measuring device for measuring the spacing between the cutting gas nozzle and the workpiece. The spacing measurement can be carried out, for example, optically or mechanically. The spacing can be adjusted using the spacing measuring device in such a manner that, on the one hand, it is large enough to prevent the cutting gas nozzle from being touched with the workpiece or portions protruding from the workpiece and, on the other hand, it is small enough to allow good coupling of the cutting gas flow in the workpiece.

In some implementations, the spacing measuring device is configured to measure the capacitance between the cutting gas nozzle and the workpiece and to determine the spacing between the cutting gas nozzle and the workpiece surface taking into consideration the influence of the oblique cutting angle on the capacitance. Characteristic lines can be stored in the spacing measuring device and define the association between the capacitance and the spacing at an oblique cutting angle (for example, at 0°, 15°, 30°, 45°, etc.). The characteristic lines can in this instance be obtained by calibration measurements during which the (known) spacing between the cutting gas nozzle and the workpiece surface is varied for a fixed oblique cutting angle.

In some implementations, the control device is configured to determine the position of the laser cutting beam adapted to the oblique cutting angle based on the spacing between the cutting gas nozzle and the workpiece surface and the diameter of the nozzle opening. This may be carried out using the formula set out above.

In another aspect, a computer program product which includes computer readable code for setting up a processing program configured to carry out all the steps of the above-described method when the processing program is executed on the control device of the laser processing machine is disclosed. The computer program product may include a computer-readable medium such as, for example, a disk or another data carrier, on which a program code is stored and which is suitable for setting up the processing program based on data that can be established by a user through a suitable operating surface and that relate to the desired oblique cutting operation (type of workpiece, type of contour, etc.). The processing program can be set up before the workpiece is processed and transmitted to the control device before the processing operation through a computer-readable medium or through another form of data transmission.

The features mentioned above and those set out below can also be used individually or together in any combination. The embodiments shown and described are not intended to be understood to be a conclusive listing but instead are of an exemplary nature.

The details of one or more embodiments are set forth in the accompanying drawings and the description below. Other features and advantages will be apparent from the description and drawings, and from the claims.

BRIEF DESCRIPTION OF DRAWINGS

FIG. 2 is a schematic external view of the laser cutting head of the laser processing machine of FIG. 1a.

DETAILED DESCRIPTION

Figures 1A, 1B:
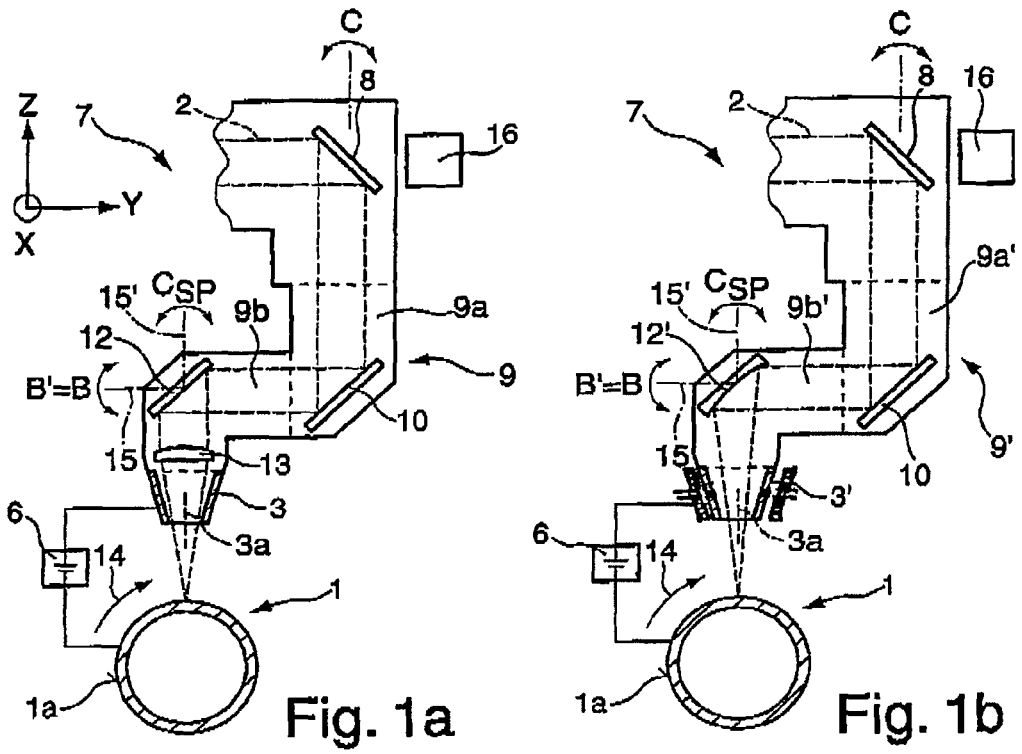
FIGS. 1a and 1b are schematic illustrations of a laser processing machine.

FIG. 1a shows a portion of a laser processing machine 7 that is configured for processing the workpiece surface 1a of a tubular workpiece 1 in a cutting manner using a laser cutting beam 2. In the laser processing machine 7, the laser cutting beam 2 is directed onto a redirecting mirror 8 using a beam guide (not shown) and is subsequently introduced into a first structural unit 9a of a laser processing head 9, in which unit another redirecting mirror 10 is arranged. The redirecting mirrors 8, 10 may be in the form of adaptive mirrors.

A second structural unit 9b of the laser processing head 9 is arranged on the first structural unit 9a for rotation about a second direction (B axis) relative to the first structural unit 9a using a motorized drive (not shown). The redirecting mirror 10 arranged in the first structural unit 9a redirects the laser beam 2 from a first direction C into the second perpendicular direction B. The first structural unit 9a can be rotated about the first direction (C axis) using a motorized drive, although this is not necessary.

Another redirecting mirror 12 is arranged in the second structural unit 9b and redirects the laser beam 2 from the second direction B to a focusing lens 13 and, from that location, onto the workpiece 1 or the workpiece surface 1a. The focal point of the laser beam 2 can be changed by the adaptive redirecting mirror 10. The shape of the adaptive redirecting mirror 10 can be changed, for example, using piezoelectric elements or by applying pressure using a fluid at the rear side of the mirror 10. The laser processing machine 7 has, as a movement device for moving the workpiece 1 in the ZY plane, a clamping chuck 14 that rotates the workpiece 1. The clamping chuck 14 also can move the workpiece 1 in the X direction. The laser processing head 9 may also be displaced or rotated in other directions using conventional displacement or rotary units.

Figure 2:
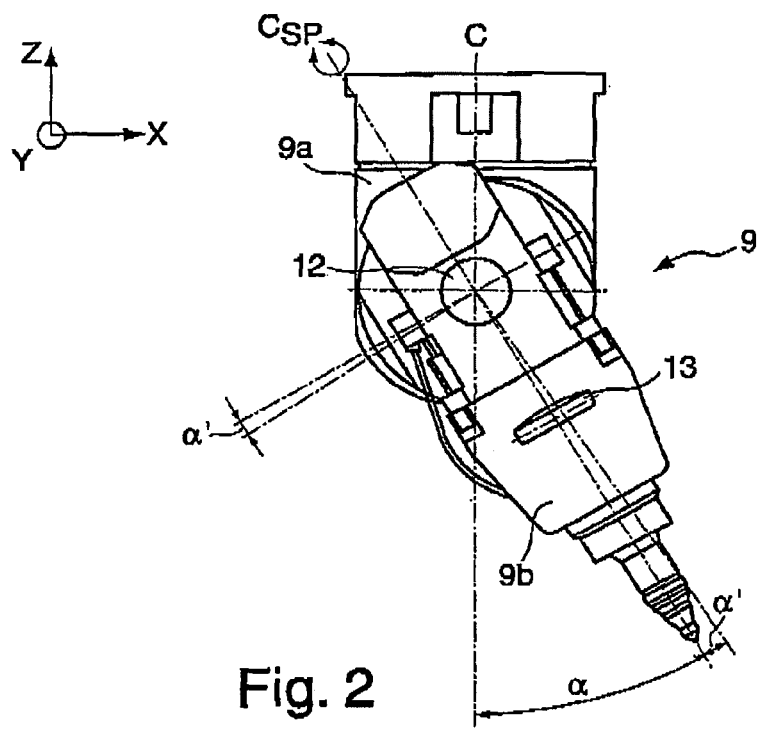

The second structural unit 9b can be rotated about the B axis to orient the nozzle axis 3a of the cutting gas nozzle 3 at an oblique cutting angle $\alpha$ relative to the C axis (see FIG. 2). When the second structural unit 9b is rotated relative to the first structural unit 9a, the redirecting mirror 12 in the second structural unit 9b is also rotated so that it remains orientated coaxially relative to the nozzle axis 3a independently of the oblique cutting angle $\alpha$.

An eccentric orientation or positioning of the laser cutting beam 2 relative to the nozzle axis 3a of the cutting gas nozzle 3 may be advantageous for various applications, as set out in greater detail below. In order to obtain such an orientation in the form of a lateral displacement between the laser beam 2 and the nozzle axis 3a, the redirecting mirror 12, such as, for example a water-cooled, copper mirror, may further be rotated through an angle of rotation $\alpha'$ about the second direction B using a numerically controlled drive in the form of a servomotor 15 (indicated with a broken line in FIG. 1a). The drive 15 forms an independent B' axis that extends coaxially relative to the B axis already present. The eccentric orientation or positioning of the laser beam 2 relative to the nozzle center of the cutting gas nozzle 3 may be brought about independently of the adjustment of the oblique cutting angle $\alpha$. The oblique cutting angle $\alpha$ corresponds to an angle of rotation B about the B axis and the angle of rotation $\alpha'$ corresponds to an angle of rotation B' about the B' axis.

In the laser processing head 9, in which the axis of rotation B of the second structural unit 9b and the axis of rotation B' of the redirecting mirror 12 are arranged coaxially, it is further possible to correct the eccentricity of the laser beam 2 back to the intended position of the laser beam 2 on the workpiece 1 using the B axis, where eccentricity is useful for applications such as oblique cutting.

A control device 16 controls the servomotor 15 in order to rotate the redirecting mirror 12 about the angle of rotation $\alpha'$ out of its rest position, in which the beam reflection direction of the laser cutting beam 2 extends coaxially relative to the nozzle axis 3a. The control device 16 simultaneously rotates the second structural unit 9b in an opposing direction at the same angle of rotation $\alpha'$ about the B axis so that the lateral offset of the position of the focused laser beam 2 on the workpiece 1, brought about by the eccentric orientation of the laser beam 2 in the cutting gas nozzle 3, can be compensated for so that the desired Tool Center Point (TCP) is reached. In other words, when the redirecting mirror 12 is rotated about the angle of rotation α' out of its rest position, the second structural unit 9b is arranged/rotated under an angle of rotation α-α' for cutting the workpiece under an oblique cutting angle α. Thus, the second structural unit 9b is rotated to a lesser degree as compared to the case when the redirecting mirror 12 is in its rest position. By the two coaxial axes B and B' being (force) connected in technical control terms, the control of the macro-movement of the laser processing head 9 and the variation of the oblique cutting angle α can be carried out as if the laser processing beam 2 were orientated coaxially relative to the nozzle axis 3a.

Alternatively or in addition to the possibility of rotating the redirecting mirror 12 about the B' axis, the redirecting mirror 12 can also be rotated about an axis CSP which is coaxial relative to the nozzle axis 3a, for which purpose another numerically controlled drive 15' can be provided in the second structural unit 9b of the laser processing head 9, as illustrated in FIG. 1a. In any case, numerical control of the position of the laser beam 2 on the workpiece 1 can be carried out by providing an additional axis of rotation which extends parallel with the incidence direction of the laser beam 2 on the redirecting mirror 12 (B' axis) or parallel with the reflection direction of the laser beam 2 (CSP axis) even in the case of eccentric orientation of the laser cutting beam 2 at the cutting gas nozzle 3 in the control unit 16.

FIG. 1b shows a laser processing machine 7 which has a laser processing head 9' that differs from the laser processing head 9 shown in FIG. 1a in that the planar redirecting mirror 12 is replaced by a concave mirror 12' with substantially parabolic geometry. The concave mirror 12' serves to focus the laser cutting beam 2 so that it is possible to dispense with a focusing lens in the laser processing head 9'. Since the focusing lens is no longer available for building up the pressure of the cutting gas, the cutting gas nozzle 3' is in the form of an annular gap nozzle, which allows pressure build-up in that the cutting gas is supplied to it. The pressure build-up in the laser processing head 9' may also be brought about in some other manner, for example by providing a pressure window in the second structural unit 9b which may be in the form of a transmissive optical element, e.g., a planar plate. Producing the eccentricity using the focusing lens 13 consequently differs in the case of the angles of rotation α' used here typically of less than 1°, in particular less than 0.5°, only in an insignificant manner from focusing using the concave mirror 12'. The angles of rotation α' may not be selected to be too large because otherwise the laser cutting beam 2 would strike the inner edge of the nozzle opening of the cutting gas nozzle 3.

An oblique cutting operation is described in detail below as a possible application for the laser processing head 9, 9' or the laser processing machine 7 shown in FIGS. 1a, 1b and 2. The laser processing head 9, 9' can also be advantageously used in other applications, for example for high-speed cutting, in which the laser cutting beam is inclined in an advance direction.

Figure 3A:
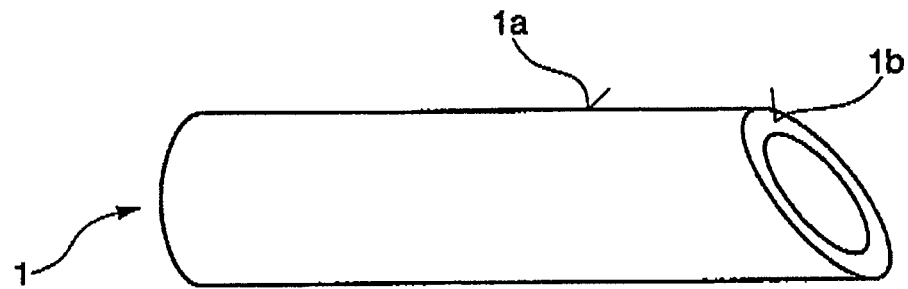
FIG. 3a is a schematic illustration of a tubular workpiece having a 45° portion with a planar cut face.

FIG. 3a shows the tubular workpiece 1 of FIGS. 1a-1b, on which a 45° portion is formed with a planar cut face 1b which can be welded to an additional tubular workpiece (not illustrated) with a planar cut face, with a 90° angle being formed along a thin weld seam which connects the cut faces. In order to produce the planar cut face 1b, an oblique cutting operation on the tubular workpiece 1 is performed, in which the oblique cutting angle α (see FIG. 2) is varied in the range between −45° and 45° since, in a conventional cutting operation with a constant oblique cutting angle α, a warped cut face would be produced on the workpiece 1.

Figure 3B:
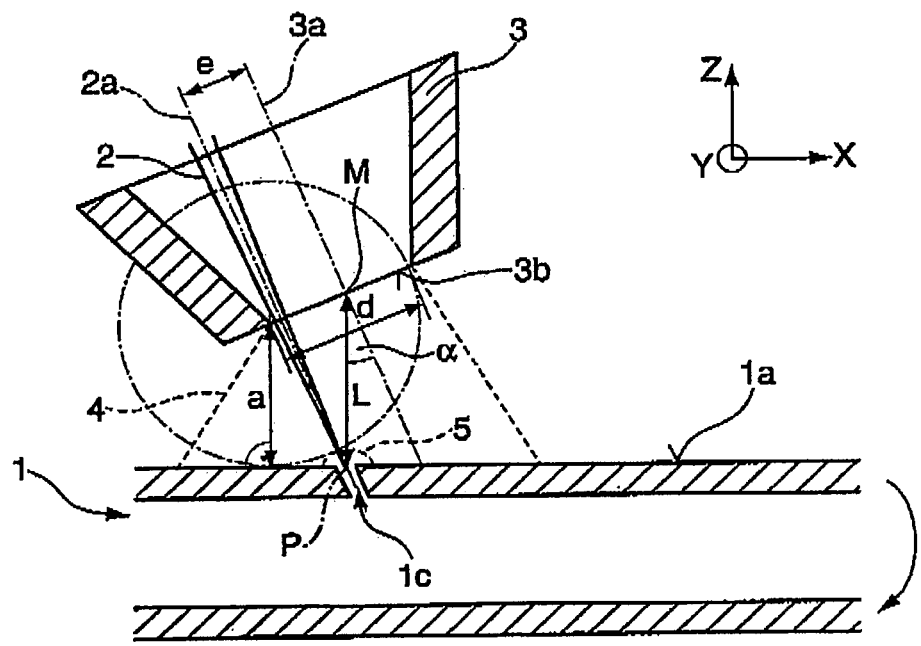
FIG. 3b is a schematic illustration of an oblique laser beam cutting operation.

FIG. 3b shows a snapshot of such an oblique cutting operation with a laser beam on the tubular workpiece 1 at an oblique cutting angle α of approximately −20°, in which the laser cutting beam 2 is orientated towards the workpiece surface 1a with its beam axis 2a with respect to the surface normal. There is orientated, parallel with the laser cutting beam 2, the nozzle axis 3a of a cutting gas nozzle 3, from which a supersonic cutting gas flow 4 is discharged and is directed onto the workpiece surface 1a. The supersonic cutting gas flow 4 forms a high-pressure region 5 on the workpiece surface 1a which is offset relative to the nozzle axis 3a of the cutting gas nozzle 3 and whose position relative to the nozzle axis 3a, in addition to the oblique cutting angle α, is also dependent on the diameter d of the cutting gas nozzle 3 and the spacing a between the edge of the nozzle opening 3b of the cutting gas nozzle 3 and the workpiece surface 1a.

In order to position the laser cutting beam 2 in the high-pressure region 5 on the workpiece surface 1a, the beam axis 2a of the laser cutting beam 2, and consequently also the cutting joint 1c, is displaced by a spacing (eccentricity) e with respect to the nozzle axis 3a during the oblique cutting operation with a laser beam. In order to determine the eccentricity e in accordance with the parameters α, d and a, a simple geometric model based on the momentum conservation law is used: the highest pressure and consequently the center of the high-pressure region 5 are located where the atoms of the supersonic cutting gas flow 4 strike the workpiece surface 1a in a substantially perpendicular manner. If it is assumed that the gas molecules travel substantially concentrically from the nozzle opening 3b, this position P is determined by the point on the workpiece surface 1a that is located directly below the center point M of the nozzle opening 3b and is located spaced by a length L therefrom on the workpiece surface 1a.

As can be seen from FIG. 3b, the following applies: e=L sin (α). As can also be inferred from FIG. 3b, the length L=a+d/2 sin (α). Consequently, the following overall relationship exists for the eccentricity between the beam axis 2a of the laser cutting beam 2 and the nozzle axis 3a of the laser processing nozzle 3:

$$e=\sin(\alpha)(a+(d/2)\sin(\alpha)).$$

From the above formula, with a given nozzle diameter d which is constant during the entire oblique cutting operation, and the predeterminable variable spacing a between the cutting gas nozzle 3 and the workpiece surface 1a, and the oblique cutting angle α, it is possible to determine the eccentricity e that can be adjusted so that the laser cutting beam 2 remains in the high-pressure region 5 when the tubular workpiece 1 is rotated about an advance direction Y of an XYZ co-ordinate system, with the oblique cutting angle α being varied, as indicated in FIG. 3b. Such an advance enables the 45° portion illustrated in FIG. 3a to be produced on the tubular workpiece 1. With the variation of the oblique cutting angle α in the X direction, that is to say, perpendicularly with respect to the advance direction Y in a range between −45° and 45°, the position P of the laser cutting beam 2 must be monitored accordingly so that the laser cutting beam 2 remains in the high-pressure region 5.

Figure 4A:
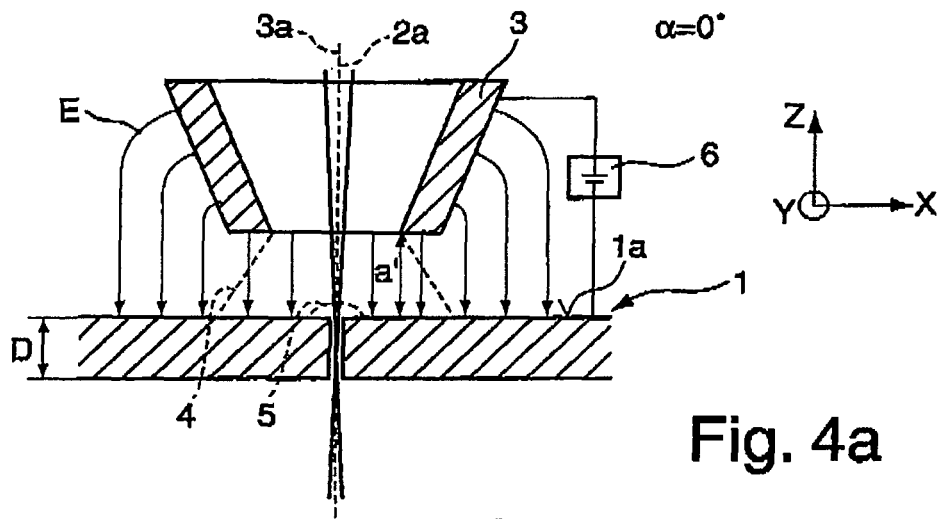
FIGS. 4a-4c are schematic illustrations of the electrical field strength between a workpiece and a sensory cutting gas nozzle at an oblique cutting angle of 0°, 30° or 45°, respectively.
Figure 4B:
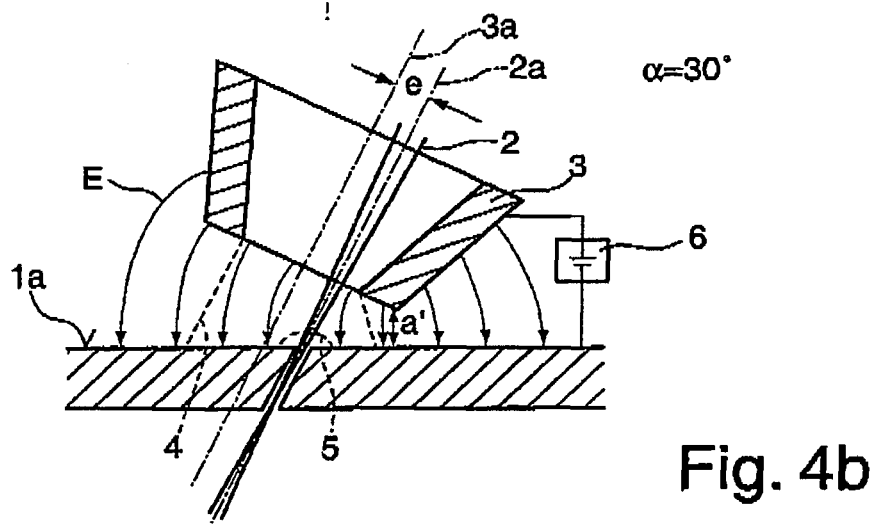
Figure 4C:
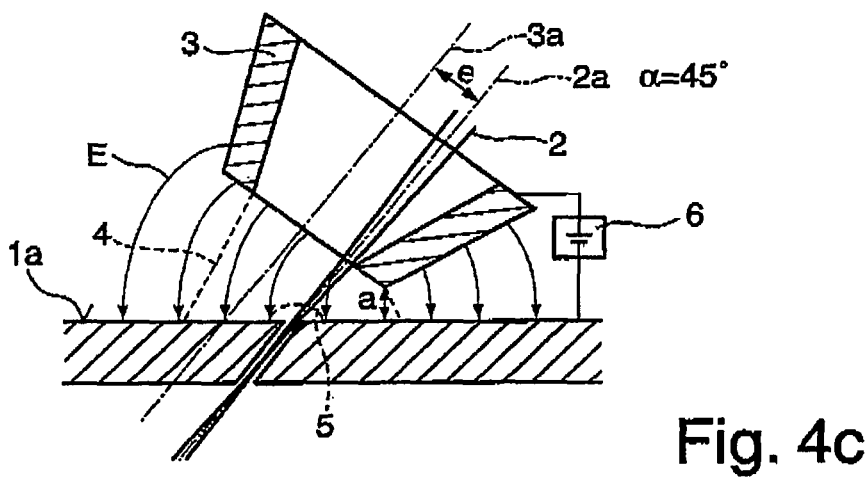

In some implementations, it can be advantageous to monitor and optionally adjust the spacing a between the cutting gas nozzle 3 and the workpiece 1 during the oblique cutting operation. It is possible to provide, as shown in FIGS. 4a-4c, a capacitive spacing measuring device 6 which can be constructed as disclosed in EP 1 684 046 A1 or EP 0 873 813 B1. The spacing measuring device 6 produces a potential difference between the metal nozzle body of the cutting gas nozzle 3 and the workpiece 1, which is also metal, so that there is formed between the two an electrical field E whose field lines are shown in FIGS. 4a-4c for oblique cutting angles α of 0°, 30° and 45°.

Depending on the capacitance, which is measured between the cutting gas nozzle 3 and the metal workpiece 1, the position of the field lines E (and consequently the capacitance between the workpiece 1 and cutting gas nozzle 3) changes. In order to determine the relation between the capacitance and spacing a at a given oblique cutting angle α, it is possible, for example, at the three oblique cutting angles α shown in FIGS. 4a-4c, to take a capacitance measurement at a variable known spacing in order to obtain characteristic field lines for the spacing in accordance with the capacitance at a constant oblique cutting angle. For the spacing measurement at oblique cutting angles α for which no such characteristic line was determined, it is possible to interpolate between the known characteristic lines. The capacitively measured spacing a' is determined in this instance between the outer edge of the cutting gas nozzle 3 and the workpiece 1, whereas the spacing a shown in FIG. 1b is defined between the edge of the nozzle opening 3b and the workpiece 1. With a known nozzle geometry of the cutting gas nozzle 3 in the spacing measuring device 6, a conversion of the capacitively measured spacing a' can be carried out to give the spacing a between the edge of the nozzle opening 3a and the workpiece 1 in order to introduce the latter into the formula set out above.

As can also be seen in FIGS. 4a-4c, the beam axis 2a of the laser cutting beam 2 is orientated at the different oblique cutting angles α with a different spacing e with respect to the nozzle axis 3a in order to keep the cutting gas beam 2 in the high-pressure region 5. Furthermore, the laser cutting beam 2 is not focused on the workpiece surface 1a but instead below the surface with spacing of more than 50% of the thickness d of the workpiece 1 from the upper side 1a of the workpiece 1. Owing to such focusing, the quality of the cut edges in the oblique cutting operation can be further increased. The focusing can also be carried out in this instance with a spacing of more than 70% of the thickness of the workpiece 1 from the workpiece upper side 1a; depending on the operating conditions, the laser cutting beam 2 can also be focused below the lower side of the workpiece 1.

The control device 16 shown in FIGS. 1a and 1b serves in this instance to control the axes B' or CSP in such a manner that the laser cutting gas beam 2 is orientated in the X direction with the desired spacing relative to the supersonic cutting gas beam 4 (not shown in FIGS. 1a and 1b). The formula set out above for the eccentricity e can be stored in the machine control system of the laser processing machine 1 in this instance so that the control device 16 can calculate the optimum eccentricity itself.

Figure 5A:
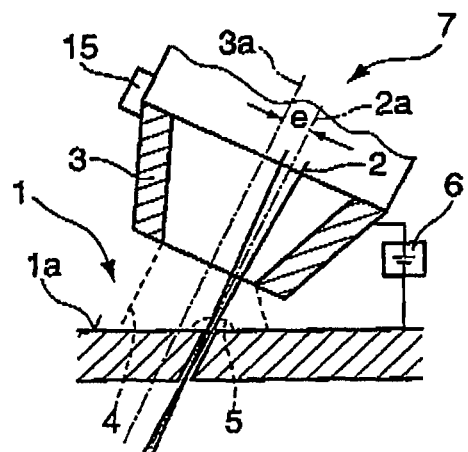
FIG. 5a is a schematic illustration of a part-region of a laser processing machine.

The laser processing machine 7 of FIGS. 1a and 1b can also be configured for oblique cutting of a plate-like workpiece 1, as illustrated in FIG. 5a, in which the advance direction extends in the X direction. Also in this instance, the eccentricity e between the laser beam axis 2 and the nozzle axis 3a can be adjusted in the manner described above or optionally also in another manner. For example, in the case of the cutting of plate-like workpieces as shown in FIG. 5a, the oblique cutting angle does not necessarily have to be varied during the laser beam cutting. Instead, the oblique cutting angle can also assume a constant value so that a planar oblique cut edge is formed on the workpiece 1. When two such plate-like workpieces are connected at an angle of, for example, 90° along two oblique cut edges, they abut each other in a planar manner so that the two plate-like workpieces can be more readily welded together. Of course, it is also possible to cut plate-like workpieces with complex geometric shapes that require a modification of the oblique cutting angle during the laser beam cutting operation.

Figure 5B:
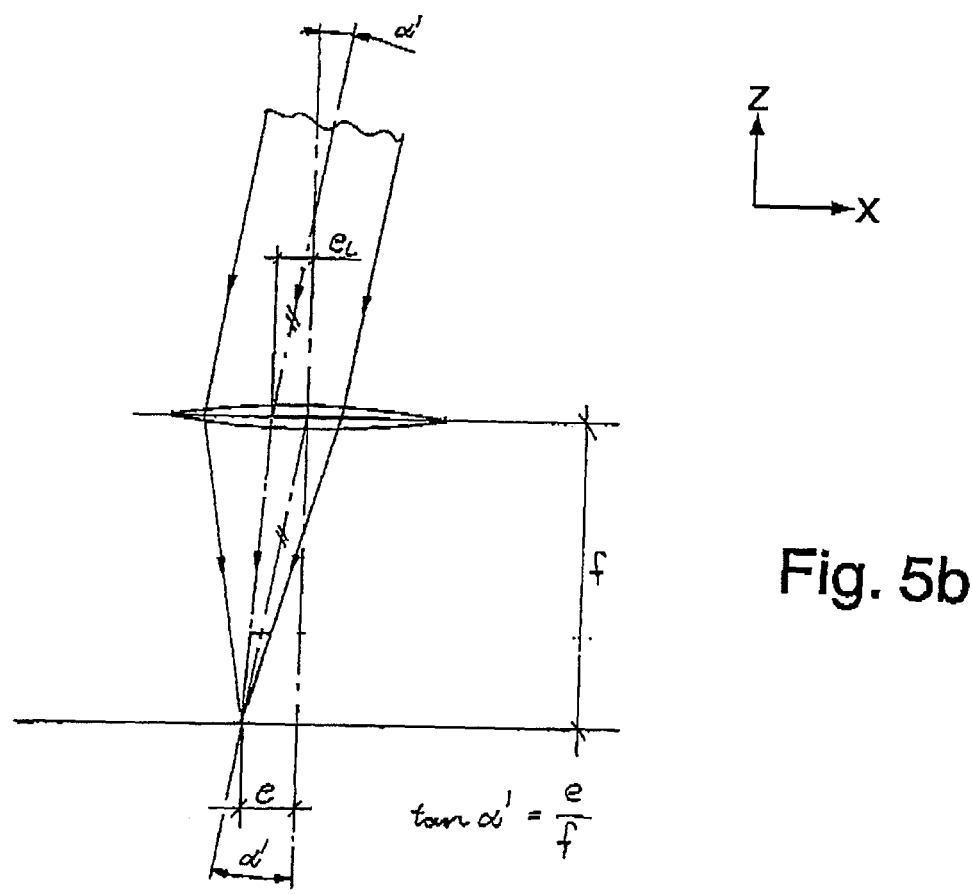
FIG. 5b is a schematic illustration of skewed focusing of a laser cutting beam.

In order to produce a displacement between the beam axis 2a of the laser cutting beam 2 and the supersonic cutting gas flow 4 or the nozzle axis 3a, there are also possibilities other than those described above. For example, by displacing or tilting an optical element, such as the redirecting minors 12a, 12b, the desired eccentricity e relative to the nozzle center can also be produced. During the oblique cutting operation, the laser beam axis 2a is not necessarily orientated parallel with the nozzle axis 3a. Therefore, it is possible to produce the eccentricity e on the workpiece surface 1a through rotation of the concave minor 12' or skewed focusing on the focusing lens 13, as set out below with reference to FIG. 5b.

For skewed focusing, the redirecting mirror 12 can be rotated using one of the rotary drives 15, 15' shown in FIGS. 1a and 1b so that the laser cutting beam 2 does not strike the focusing lens 13 in a perpendicular manner, but instead at an angle α' with respect to the nozzle axis, and strikes with its laser beam axis 2a offset in the X direction by a spacing eL with respect to the optical axis 13a of the focusing lens 13. The tilting angle α' required to produce a desired eccentricity e on the workpiece 1 can be determined in this instance by geometric considerations. It is not absolutely necessary to produce a spacing eL between the optical axis 13a of the focusing lens 13 and the laser beam axis 2a for the skewed focusing, but instead for the laser beam axis 2a to intersect with the focusing lens 13 centrally at the optical axis 13a of the lens 13.

In order to achieve appropriate operating conditions for the oblique cutting operation, an inert gas, for example nitrogen, is used as a cutting gas, which is at a high cutting gas pressure of typically more than 10 bar in a pressure chamber (not illustrated) of the laser cutting head 9 adjacent to the cutting gas nozzle 3, or is supplied to the annular gap nozzle 3' of the laser processing head 9'. Furthermore, the spacing between the cutting gas nozzle 3, 3' and the workpiece surface 1a should be selected so as to be as small as possible in order to achieve optimum cutting results. In some implementations, it is advantageous for the (inner) diameter of the cutting gas nozzle 3 to be large, for example, 2 mm or more for the oblique cutting operation at large oblique cutting angles of, for example, 45°. A round nozzle cross-section does not necessarily having to be selected.

The operation described above in principle for oblique cutting with a laser beam is substantially independent of the material. processed and the thickness and can be used for cutting high-grade steel, construction steel or aluminium. The oblique cutting operation is not limited to the separation cutting of tubular workpieces but instead any contours, for example also on plate-like workpieces, can be cut in the manner described above using the laser cutting beam. Using the oblique cutting operation described herein, it is possible, in some implementations, to achieve both a high quality of the cut edges produced during the separation cut and advance rates that are comparable to those obtained perpendicular laser beam cutting with respect to the effective cutting depth.

A number of embodiments have been described. Nevertheless, it will be understood that various modifications may be made. Other embodiments are within the scope of the following claims.

What is claimed is:

1. A method for orienting a focused laser beam relative to a nozzle axis of a cutting gas nozzle, the method comprising:
    producing a supersonic flow of cutting gas from the cutting gas nozzle;

providing a laser beam along a first direction in a first structural unit of a laser processing head;

redirecting, in the first structural unit, the laser beam from the first direction to a second direction;

providing the laser beam along the second direction to a redirecting mirror arranged in a second structural unit of the laser processing head;

rotating the redirecting mirror about the second direction or about an axis of the cutting gas nozzle, such that the laser beam is oriented eccentrically in an opening of the cutting gas nozzle relative to the nozzle axis, wherein the redirecting mirror is arranged in a beam path of the laser beam and upstream of the cutting gas nozzle;

simultaneously rotating the second structural unit while rotating the redirecting mirror, wherein the rotation of the second structural unit is about the second direction and relative to the first structural unit, wherein rotating the redirecting mirror comprises rotating the redirecting mirror to a first angle of rotation $\alpha'$ with respect to a rest position, where a beam reflection direction of the laser beam in the rest position extends coaxially with respect to the nozzle axis, and wherein the second structural unit is rotated to an angle equal to a difference between an oblique cutting angle $\alpha$ and the first angle of rotation $\alpha'$.

2. The method according to claim 1, further comprising focusing the laser beam on a lens element arranged between the redirecting mirror and the cutting gas nozzle.

3. The method according to claim 1, further comprising focusing the laser beam on the redirecting mirror, wherein the redirecting mirror is concave.

4. The method according to claim 1, wherein the cutting gas nozzle is an annular gap nozzle.

5. The method according to claim 1, wherein the second structural unit comprises the cutting gas nozzle.

6. The method according to claim 1, wherein the rotation of the redirecting mirror and the rotation of the second structural unit are in opposite directions.

7. The method according to claim 1, wherein simultaneously rotating the second structural unit and the redirecting mirror maintains the laser beam in a high-pressure region of a supersonic cutting gas flow emitted from the cutting gas nozzle.

8. The method according to claim 1, wherein rotating the second structural unit to an angle equal to a difference between the oblique cutting angle $\alpha$ and the first angle of rotation $\alpha'$ compensates for a lateral offset of a position of the focused laser beam on the workpiece caused by the eccentric orientation of the laser beam relative to the nozzle axis.

9. A laser processing machine for obliquely cutting a workpiece, the laser processing machine comprising:

a first structural unit arranged to redirect the laser beam from a first direction into a second direction;

a second structural unit secured to the first structural unit, the second structural unit being arranged to rotate about the second direction, the second structural unit including a cutting gas nozzle configured to provide a supersonic cutting gas flow and including a redirecting mirror arranged to rotate about the second direction or about an axis of the cutting gas nozzle to orientate the laser beam in the nozzle opening of the cutting gas nozzle eccentrically relative to the axis of the cutting gas nozzle; and a control device configured to, during operation of the laser processing machine, rotate the redirecting mirror about the second direction or about the axis of the cutting gas nozzle, rotate the redirecting mirror at a first angle of rotation $\alpha'$ from a rest position so that the laser beam is eccentrically oriented in the nozzle opening relative to the axis of the cutting gas nozzle, and simultaneously rotate the second structural unit at an angle equal to a difference between an oblique cutting angle $\alpha$ and the first angle of rotation $\alpha'$ while rotating the redirecting mirror, wherein a beam reflection direction of the laser beam from the second mirror extends coaxially relative to the nozzle axis in the rest position.

10. The laser processing head according to claim 9, wherein the second structural unit further comprises a focusing lens between the redirecting mirror and the cutting gas nozzle.

11. The laser processing head according to claim 9, wherein the redirecting mirror is a concave mirror.

12. The laser processing head according to claim 9, wherein the cutting gas nozzle is an annular gap nozzle.

13. The laser processing machine according to claim 9, further comprising a movement device configured to, during operation of the laser processing machine, move a workpiece and the laser beam relative to one another at an oblique cutting angle with respect to a surface of the workpiece.

* * * * *